US010261502B2

(12) United States Patent
Shang et al.

(10) Patent No.: US 10,261,502 B2
(45) Date of Patent: Apr. 16, 2019

(54) MODBUS TCP COMMUNICATION BEHAVIOUR ANOMALY DETECTION METHOD BASED ON OCSVM DUAL-OUTLINE MODEL

(71) Applicant: SHENYANG INSTITUTE OF AUTOMATION, CHINESE ACADEMY OF SCIENCES, Liaoning (CN)

(72) Inventors: Wenli Shang, Liaoning (CN); Jianming Zhao, Liaoning (CN); Ming Wan, Liaoning (CN); Peng Zeng, Liaoning (CN); Haibin Yu, Liaoning (CN)

(73) Assignee: SHENYANG INSTITUTE OF AUTOMATION, CHINESE ACADEMY OF SCIENCES, Shenyang, Liaoning (CN)

( * ) Notice: Subject to any disclaimer, the term of this patent is extended or adjusted under 35 U.S.C. 154(b) by 14 days.

(21) Appl. No.: 15/527,208

(22) PCT Filed: Dec. 30, 2014

(86) PCT No.: PCT/CN2014/095576
§ 371 (c)(1),
(2) Date: May 16, 2017

(87) PCT Pub. No.: WO2016/082284
PCT Pub. Date: Jun. 2, 2016

(65) Prior Publication Data
US 2017/0329314 A1 Nov. 16, 2017

(30) Foreign Application Priority Data
Nov. 26, 2014 (CN) .......................... 2014 1 0699413

(51) Int. Cl.
*H04L 29/06* (2006.01)
*G05B 19/418* (2006.01)
*H04L 12/40* (2006.01)

(52) U.S. Cl.
CPC .......... *G05B 19/4185* (2013.01); *H04L 12/40* (2013.01); *H04L 12/40039* (2013.01);
(Continued)

(58) Field of Classification Search
CPC .................................................. H04L 63/1425
See application file for complete search history.

(56) References Cited

U.S. PATENT DOCUMENTS

| | | | |
|---|---|---|---|
| 2007/0150954 A1* | 6/2007 | Shon ................... | H04L 63/1416 726/23 |
| 2015/0163121 A1* | 6/2015 | Mahaffey ............ | G06F 11/0766 707/687 |

FOREIGN PATENT DOCUMENTS

| | | |
|---|---|---|
| CN | 101557327 A | 10/2009 |
| CN | 102339389 A | 2/2012 |

(Continued)

OTHER PUBLICATIONS

Written Opinion of the International Search Authority dated Aug. 26, 2015 for International Patent Application No. PCT/CN2014/095576, (7 pages with English translation).
(Continued)

*Primary Examiner* — Farley Abad
(74) *Attorney, Agent, or Firm* — Smith, Gambrell & Russell, LLP

(57) ABSTRACT

Proposed is an anomaly detection method for communication behaviors in an industrial control system based on an OCSVM algorithm. According to the present invention, a normal behavior profile model and an abnormal behavior profile model, i.e. a dual-outline model, of communication
(Continued)

behaviors in an industrial control system are established, parameter optimization is performed by means of a particle swarm optimization (PSO) algorithm, an optimal intrusion detection model is obtained, and abnormal Modbus TCP communication traffic is identified. According to the present invention, the false alarm rate is reduced by means of cooperative discrimination of the dual-outline detection model, the efficiency and reliability of anomaly detection are improved, and the method is more applicable to practical applications.

8 Claims, 3 Drawing Sheets

(52) U.S. Cl.
CPC .......... *H04L 29/06* (2013.01); *H04L 63/1425* (2013.01); *H04L 2012/40228* (2013.01)

(56) References Cited

FOREIGN PATENT DOCUMENTS

| | | |
|---|---|---|
| CN | 102420723 A | 4/2012 |
| CN | 103439933 A | 12/2013 |
| CN | 103561018 A | 2/2014 |
| CN | 103927483 A | 7/2014 |
| WO | 2013/015691 A1 | 1/2013 |

OTHER PUBLICATIONS

International Preliminary Report on Patentability dated May 30 2017 for International Patent Application No. PCT/CN2014/095576, (9 pages with English translation).
Shang, Wenli et al., "Modbus/TCP Communication Anomaly Detection Algorithm Based on PSO-SVM", Actaelectronica Sinica, vol. 42, No. 11, 15 Nov. 15, 2014, pp. 2316-2318 (English Abstract provided with Google Machine Translation).
International Search Report dated Aug. 26, 2015 for PCT/CN2014/095576 (5 pages—Chinese with English machine translation).
Chinese Search Report for Chinese Patent App. No. 201410699413.3 dated Dec. 14, 2016 (1 page).
First Chinese Office Action for Chinese Patent Application No. 201410699413.3 dated Dec. 22, 2016 (3 pages in Chinese, and English Translation).
Second Chinese Office Action for Chinese Patent Application No. 201410699413.3 dated. Feb. 20, 2017 (3 pages in Chinese, and English Translation).

* cited by examiner

MODBUS TCP COMMUNICATION BEHAVIOUR ANOMALY DETECTION METHOD BASED ON OCSVM DUAL-OUTLINE MODEL

TECHNICAL FIELD

The present invention proposes a Modbus TCP communication behaviour anomaly detection method based on an OCSVM dual-outline model, and belongs to the field of network security of industrial control systems.

BACKGROUND

With the rapid promotion of the industrial informationization process, information, network and Internet of things technologies are widely applied in the industrial control fields of smart grid, intelligent transportation systems, industrial production systems and the like, and comprehensive benefits of enterprises are greatly increased. To achieve cooperation and information sharing among the systems, the industrial control systems also gradually break the past closure: i.e., adopt standard and universal communication protocols and hardware and software systems; and even some industrial control systems can be connected to the Internet and other public networks in some manners. This allows the industrial control systems to inevitably face traditional information security threats such as viruses, Trojan, hacker intrusion, denial of service and the like. Moreover, since the industrial control systems are mainly applied in national important industries such as electric power, transportation, petrochemical engineering, nuclear industry and the like, the social influence and the economic loss caused by security accidents will be more serious.

In 2010, a powerful computer virus "Stuxnet" appears, which aims to attack the industrial control systems manufactured by Siemens. The virus can be transmitted to a device inserted into a USB interface of a computer, and then can steal data from the device. This is a virus for the hackers to give a first attempt to intrude large industrial computer systems. This event sounds the alarm to "prevent a virus attack".

In a "Prism" event in June 2013, information security attracts wide attention again. When acquisition and analysis of big data become the only way of the Prism plan, enterprises in the forefront of science and technology are inevitably involved in the plan. An intelligent industrial control field cannot leave well alone.

Traditional IT security protection technologies such as firewall, antivirus software, intrusion detection technologies and the like are difficult to be effectively applied to the industrial control systems. This is mainly because the packet filtering firewall is difficult to protect against the attack on an application layer, inspection degree is inversely proportional to timeliness, and the firewall can do nothing for an internal attack. Care should be install antivirus software in the industrial control systems. Once an antivirus mistake occurs, the resulting consequence may be quite serious.

The industry is an important part of key national infrastructures, and the security of the industrial control systems concerns the national strategic security. Currently, the development and the application of various novel information technologies including industrial control informatization, integration of three networks, Internet of things and cloud computing propose a new task and a new challenge for the information security guarantee work of the industrial control systems, and the security problem of the industrial control systems is unignorable.

An intrusion detecting system can detect an attack before an intrusion attack harms the system, give an alarm and start a defensive measure. At present, the intrusion detection is mainly classified into two categories: misuse detection and anomaly detection. Misuse detection achieves intrusion detection through the matching degree with a known abnormal behaviour, and often is also called as prior-knowledge-based intrusion detection, while anomaly detection is to seek a deviated abnormal behaviour by establishing a normal behaviour model, and is therefore also known as behaviour-based intrusion detection. Compared with misuse detection, anomaly detection has a reduced missed alarm rate, and can detect an intrusion behaviour that does not appear before, but has a high false alarm rate.

In the intrusion detection of industrial control, an anomaly detection method based on a "white list" rule can effectively detect the abnormal behaviours of a single communication protocol, but cannot detect the communication abnormal behaviours that coexist in a plurality of data packets. An anomaly detection method based on a communication mode can make up for the defect of the detection method based on a "white list" rule.

The present invention proposes that the important field of Modbus function codes is selected as a study object; according to a preprocessing method capable of processing the sequences containing different numbers of Modbus function codes, based on a one-class support vector machine method, a normal behaviour profile model and an abnormal behaviour profile model, i.e., a dual-outline model, of communication behaviours in the industrial control systems are established; an anomaly detection method of the communication behaviours based on a PSO-OCSVM dual-outline model, which can perform parameter optimization based on a particle swarm optimization (PSO) algorithm, is designed; and the identification of an attack behaviour or abnormal behaviour which is unrecognized by the firewall and the intrusion detecting system can be achieved through the cooperative discrimination of the dual-outline detecting model.

SUMMARY

In view of the situation proposed in the background that sample distribution of industrial control systems such as SCADA, DCS and the like is unbalanced or abnormal samples are difficult to acquire, the present invention proposes a Modbus TCP communication behaviour anomaly detection method based on an OCSVM dual-outline model, and establishes a communication behavior dual-outline model based on a one-class support vector machine algorithm for performing anomaly detection of the industrial control systems.

To realize the above-mentioned purposes, the present invention discloses the technical solution: A communication behaviour anomaly detection method based on OCSVM comprises the following steps:

feature extraction: Modbus TCP normal communication traffic and abnormal communication traffic in the industrial control systems are respectively collected and stored, unnecessary information is eliminated, and the collected communication traffic is finally converted into two sequences which only comprise Modbus function codes;

data preprocessing: the length r of short sequences is set as needed; two sequences of the Modbus function codes are cyclically processed respectively with a sliding window with the length of r; the two sequences of the Modbus function codes are respectively converted into a plurality of short sequences with the length of r; repeated short sequences are eliminated to obtain a set of the short sequences and arrange each of the short sequences according to an appearance order for constructing an OCSVM normal communication feature vector and an OCSVM abnormal communication feature vector;

modeling: the OCSVM normal communication feature vector and the OCSVM abnormal communication feature vector are respectively imported to matlab; a libsvm toolkit is invoked through matlab for respectively generating a positive profile OCSVM model and a negative profile OCSVM model;

PSO optimization: parameter optimization is performed on the positive profile OCSVM model and the negative profile OCSVM model respectively: initialized particles are transmitted to the positive profile OCSVM model/the negative profile OCSVM model as an OCSVM inherent parameter v and a gauss radial base parameter g; classification accuracy rates returned by the positive profile OCSVM model/the negative profile OCSVM model under the significance of cross verification are used as fitness values in a PSO model; and accordingly, iterative update is performed on a particle swarm;

dual-outline OCSVM anomaly detection: the positive profile OCSVM model and the negative profile OCSVM model are established by using an optimal OCSVM inherent parameter v and the gauss radial base parameter g respectively so as to perform anomaly detection, and the classification accuracy rates under the significance of cross verification are returned respectively;

cooperative discrimination rule of dual one-class support vector machines: if a judgment result of the positive profile OCSVM model is "normal" and a judgment result of the negative profile OCSVM model is "normal", a final result is "normal"; if a judgment result of the positive profile OCSVM model is "abnormal" and a judgment result of the negative profile OCSVM model is "abnormal", a final result is "abnormal"; under the condition that two judgment results are inconsistent, if a "false alarm rate" needs to be inhibited, the judgment result is "normal", and if a "missed alarm rate" needs to be inhibited, the judgment result is "abnormal".

The traffic collection comprises the following steps:

normal Modbus TCP communication traffic data packets in the network are captured by wireshark packet capturing software; when the system is attacked by viruses, abnormal Modbus TCP communication traffic data packets in the network are captured by the wireshark packet capturing software; data packets, not containing the Modbus function codes, of the normal data packets and the abnormal data packets are eliminated respectively to obtain communication traffic at a Modbus TCP client and a Modbus TCP server; all other information except the Modbus function codes is eliminated; and the Modbus function codes are arranged according to a time order.

The data preprocessing comprises the following steps:

the length r of short sequences is set as needed; the Modbus function codes are cyclically processed with a sliding window with the length of r; and repeated sequences are eliminated to obtain a set of the short sequences.

In any sequence of the Modbus function codes, the short sequences are arranged according to an appearance order of each short sequence for constructing OCSVM feature vectors;

normalization processing is performed on the OCSVM feature vectors, allowing each element in the vectors to belong to the same order of magnitude.

The PSO optimization comprises the following steps:

maximum iteration times $k_{max}$ of a PSO algorithm under the condition that an end condition is always not satisfied, and limiting ranges for particle speed and locations are set;

swarms are randomly generated and parameter initialization is performed on the PSO algorithm according to the positive profile OCSVM model and the negative profile OCSVM model respectively, wherein each particle contains two components, i.e., an inherent parameter v of the one-class support vector machine and a gauss kernel function parameter g; and an initialization speed vector and a location vector are set for each particle;

OCSVM training is performed on the particles which act as the inherent parameter v of the one-class support vector machine and the gauss kernel function parameter g; the returned classification accuracy rates under the significance of cross verification are used as the fitness values of the particles;

individual extremums and swarm extremums are continuously updated according to the situation of the fitness values: once a better fitness value appears, corresponding individual or swarm fitness values are updated;

whether an iteration exiting condition is satisfied is judged: if the maximum iteration times are exceeded or a set threshold is not exceeded after N times of continuous changes of the fitness values, the iteration process is exited; then the swarm extremum is a required optimal parameter; and the N is a set maximum continuous limiting value;

the particle swarm is updated according to particle location and speed update formulas; meanwhile, whether different dimensions of all the particles are within allowed limits is inspected; and if the different dimensions exceed the allowed ranges, the different dimensions need to be limited within a pre-set range section.

The dual-outline OCSVM anomaly detection respectively executes the following steps on the positive profile OCSVM model and the negative profile OCSVM model:

a particle transmitted in a PSO parameter optimization flow is accepted; two components of the particle are respectively set as the inherent parameter v of the one-class support vector machine and the gauss kernel function parameter g;

a set of the normal and abnormal Modbus TCP communication traffic data packets is acquired; +1 category labels are given to normal traffic data; and −1 category labels are given to abnormal traffic data;

a one-class support vector machine model for solving dual problems is constructed;

a decision function is constructed;

the classification accuracy rates under the significance of cross verification are calculated according to the decision function and the category labels;

the classification accuracy rates are returned to the PSO flow and are used as the particle fitness for calculating the value of the function Fit(i).

The support vector machine model for solving dual problems is constructed:

$$\min_{\alpha_i} L_D = \frac{1}{2}\sum_{i=1}^{l}\sum_{j=1}^{l}\alpha_i\alpha_j K(x_i, x_j)$$

wherein α=(α₁, α₂, ..., α_n) indicates a lagrangian operator, and K(x_i,x_j) indicates a gauss kernel function to obtain the solution α*=(α₁*, α₂*, ..., α_n*).

The decision function is:

$$f(x) = \text{sgn}\left(\sum_{i=1}^{l} \alpha * K(x_i, x_j) - \rho^*\right)$$

$$\rho^* = \sum_{i=1}^{l} \alpha * K(x_i, x_j)$$

wherein $\rho^*$ is a compensation value of a terminal decision function of the one-class support vector machine, sgn( ) indicates a sign function and $K(x_i,x_j)$ indicates a gauss kernel function.

The classification accuracy rates under the significance of cross verification are calculated by a 5-fold verification mode, specifically: training sets are equally divided into five parts; 4 parts are used for training the anomaly detection model every time; and the remaining part is used as a test set for verifying a detection effect.

The present invention has the following advantages and beneficial effects:

1. In the present invention, the important field of the Modbus function codes is selected as a study object; according to a preprocessing method capable of processing the sequences containing different numbers of Modbus function codes, an anomaly detection method based on the sequences of the Modbus function codes of the one-class support vector machine is proposed. The model is especially suitable for processing the classification problem of small sample data.

2. In the present invention, a dual-outline model is established by a normal communication behaviour and an abnormal communication behaviour based on the one-class support vector machine algorithm, and an anomaly detection result is determined through cooperative discrimination of the dual-outline detection model.

3. In the present invention, an OCSVM dual-outline anomaly detection model parameter is optimized by a PSO algorithm. The method avoids selecting the OCSVM parameter through experience by means of the iterative update of the particle swarm, thereby greatly increasing the efficiency.

DETAILED DESCRIPTION

The present invention will be further described in details below in combination with the drawings and the embodiments.

Figure 1:
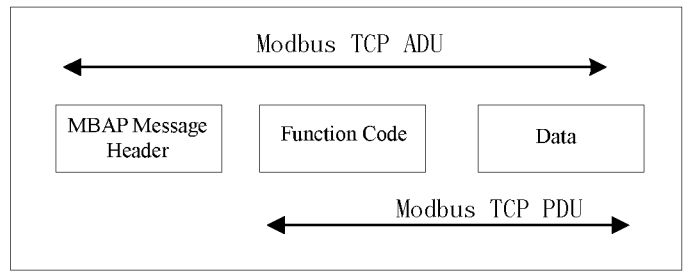
FIG. 1 is a data unit structure of a Modbus TCP application layer.
Figure 2:
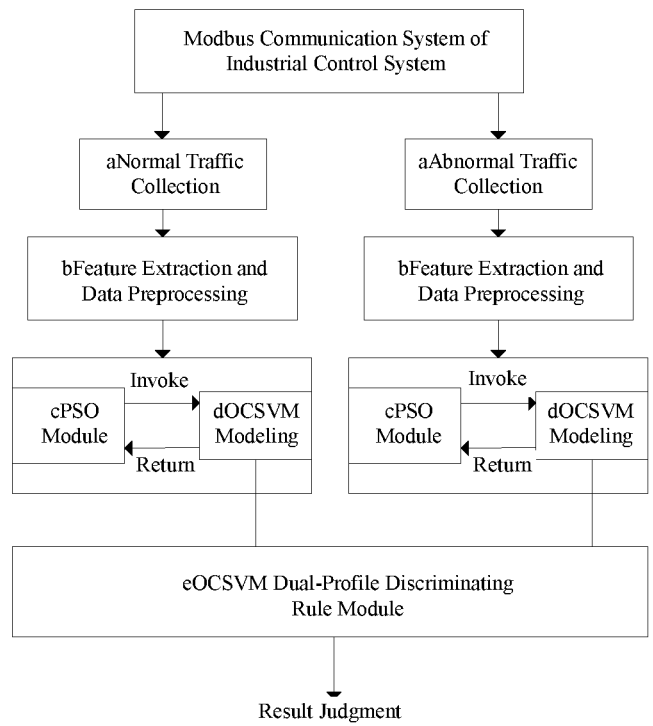
FIG. 2 is an overall frame diagram of Modbus TCP communication traffic anomaly detection based on an OCSVM dual-outline model.
Figure 3:
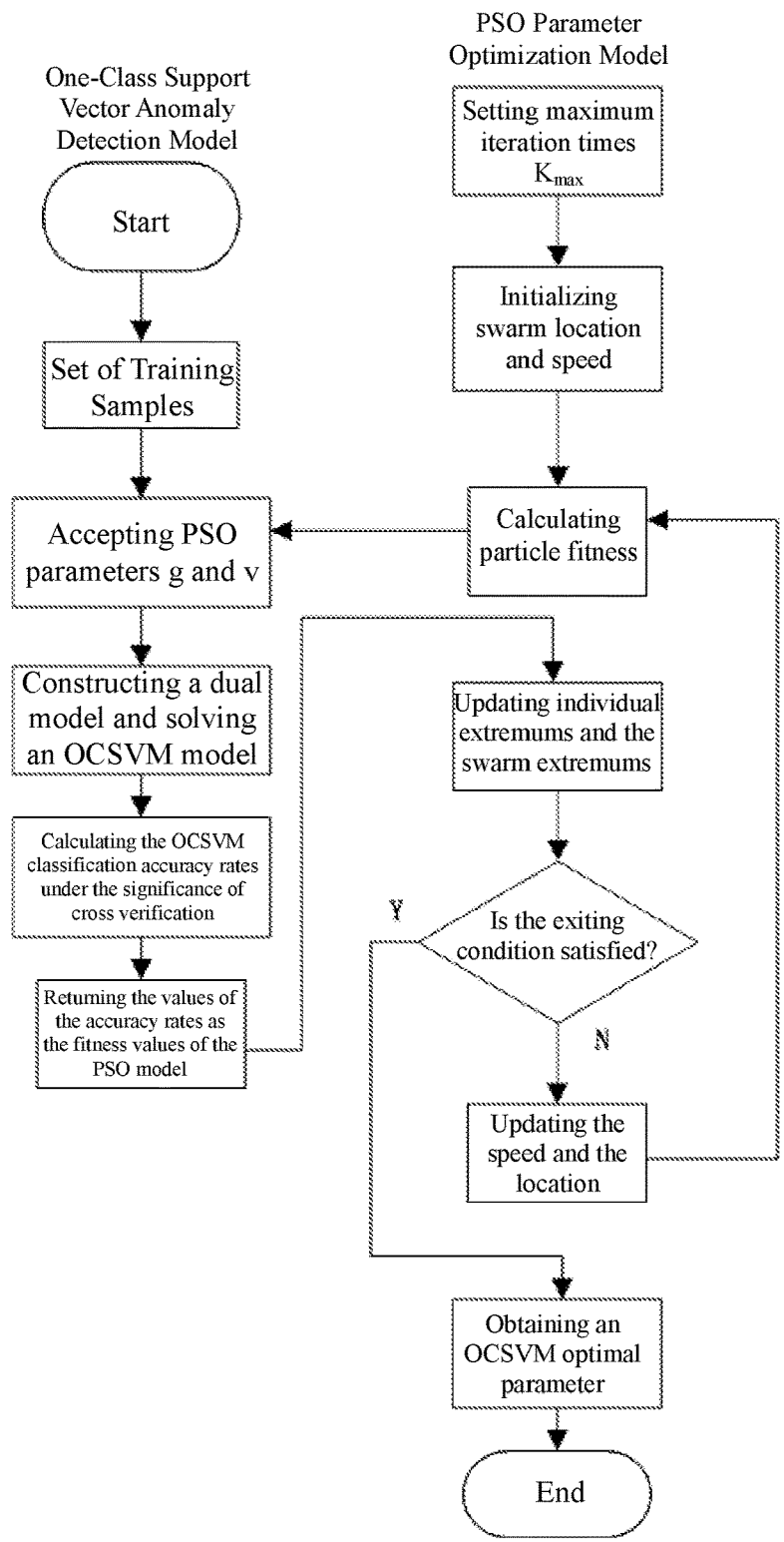
FIG. 3 is a modeling flow of a PSO-OCSVM anomaly detection model.

As shown in FIG. 2 and FIG. 3, the communication behaviour anomaly detection method based on OCSVM comprises:

a. Data collection part, as shown in FIG. 1

1 A simulation experimental environment platform is established, so that the system is in a normal operation state; the traffic data packets are captured with wireshark; and at this moment, the captured data packets are normal communication traffic data.

2 A U disk with viruses is inserted into a computer; at this moment, the system is invaded by the viruses; the traffic data packets are captured with wireshark; and at this moment, the captured data packets are abnormal communication traffic data.

3 The captured communication traffic data is respectively stored in different files, and feature extraction is performed on the data respectively.

b. Feature extraction and preprocessing part

1 A Modbus TCP message format extends some data structures on the basis of reserving all Modbus functions. The Modbus TCP message format mainly comprises three parts: MBAP message headers, Modbus function codes and data. When the client transmits a message to the server device, the field of the function codes is the only data of the server for distinguishing read operation, write operation, data types and data categories. Therefore, the Modbus function codes are used as the feature vectors.

2 The traffic data packets, not containing the Modbus function codes, of the captured data packets are firstly eliminated; and then redundant and unimportant features are eliminated and only a set of effective key features and the Modbus function codes are reserved.

3 The acquired sequences of the Modbus function codes are randomly partitioned into different lengths of short sequences of the Modbus function codes and are given labels, wherein the sequences of the Modbus function codes of normal traffic data packets are labeled as +1 and the sequences of the Modbus function codes of abnormal traffic data packets are labeled as −1.

4 The length r of short sequences is set as needed; samples of the Modbus function codes are cyclically processed with a sliding window with the length of r; and repeated sequences are eliminated to obtain a set of the short sequences.

5 In any sequence of the Modbus function codes, OCSVM feature vectors are constructed according to the appearance frequency of the short sequences in each mode.

c. PSO flow

1 Maximum iteration times $k_{max}$ of a PSO algorithm under the condition that an end condition is always not satisfied are set;

2 Locations X=(X₁, X₂, ..., X_N) and speed V=(V₁, V₂, ..., V_N) the particles are randomly generated in a D-dimensional problem space, and N is the number of the particles, wherein $X_i=(x_{ig},x_{iv})$ indicates that the $i_{th}$ particle is formed by two components which respectively represent the locations of the OCSVM parameter v and the radial basic kernel function parameter g; and the limiting ranges of the two components are set as $[X_{g\,min}, X_{g\,max}]$ and $[X_{vmin}, X_{vmax}]$;

3 The particle fitness Fit(i) is calculated. The particle fitness values Fit(i) are selected from the classification accuracy rates under the significance of cross verification detected by the sequences of the Modbus function codes based on OCSVM using $x_{ig}$ and $x_{iv}$ as parameters.

4 The individual extremums and the swarm extremums are updated according to the fitness values. If the fitness value $Fit(X_i^{k+1})>Fit(X_i^k)$, then $P^k=X^{k+1}$, otherwise, $P^k=X^k$. If j exists to cause Fit($X_j^k$)>Fit($X_j^k$) and Fit($X_j^k$) >Fit($G^k$), then $G_j^{k+1}=X_j^k$, otherwise, $G_j^{k+1}=G_j^k$.

5 Whether the iteration exiting condition is satisfied is judged. If the maximum iteration times are exceeded or 0.01% is not exceeded after 50 times of continuous changes of the fitness values, the iteration process is exited; then the swarm extremum is a required optimal parameter.

6 Update is performed according to the particle speed and location update formulas. After each round of update is ended, each dimension of the locations is determined whether to be limited within a specified range; the component beyond the range needs to be limited within the range; for example, $x_{ig} < x_{g\ min}$, then set $x_{ig}=x_{g\ min}$, and if $x_{ig} > x_{g\ max}$, the $x_{ig}=x_{g\ max}$. The speed and the locations are updated according to the following two formulas:

$$V^{k+1}=\omega V^k+c_1 r_1(P^k-X^k)+c_2 r_2(G^k-X^k)$$

$$X^{k+1}=X^k+V^{k+1}$$

In the above formulas, the first part is the current speed of the particle, and reflects the influence of the current speed of the particle on the next-iteration speed; the second part reflects the cognitive capability of a single particle, for mainly controlling the global search capability of the particle, so as to avoid bringing local optimum; and the third part reflects the social cognition capability of the whole particle swarm, indicates the mutual information influence among the particles, and is beneficial to enhancing the global search capability of the particle, wherein $c_1$ and $c_2$ are learning factors, and acceleration factors $r_1$ and $r_2$ are random numbers in [0, 1].

d. OCSVM dual-outline anomaly detection model:

A training flow of a positive profile one-class support vector machine:

1. The data packets are captured from the industrial control systems, and a new normal training sample is acquired from a preprocessing unit.

2. The inherent parameter v of the one-class support vector machine and the gauss kernel function parameter g, which are transmitted in the PSO parameter optimization flow, are accepted.

3. A one-class support vector machine model for solving dual problems is constructed:

$$\min_{a_i} L_D = \frac{1}{2}\sum_{i=1}^{l}\sum_{j=1}^{l} a_i a_j K(x_i, x_j)$$

wherein $\alpha=(\alpha_1, \alpha_2, \ldots, \alpha_n)$ indicates a lagrangian operator, and $K(x_i,x_j)$ indicates a gauss radial basic kernel function to obtain the solution $\alpha^*=(\alpha_1^*, \alpha_2^*, \ldots, \alpha_n^*)$.

4 A decision function is constructed:

$$\rho^* = \sum_{i=1}^{l} a * K(x_i, x_j)$$

$$f(x) = \text{sgn}\left(\sum_{i=1}^{l} a * K(x_i, x_j) - \rho^*\right)$$

wherein $\rho^*$ is a compensation value of the one-class support vector machine, and sgn( ) indicates a sign function.

5 The classification accuracy rates are returned to the PSO parameter optimization flow and are used as the particle fitness for calculating the value of the function Fit(i).

Figure 4:
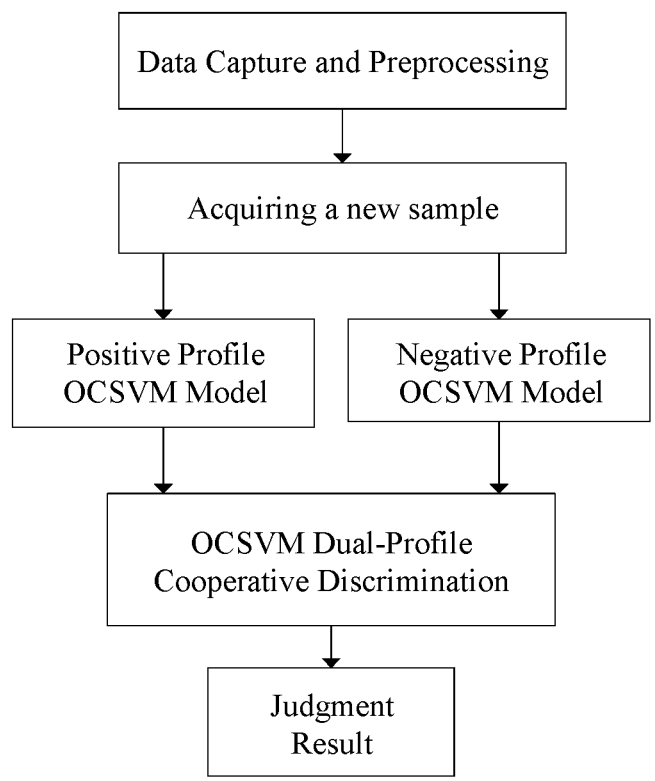
FIG. 4 is a dual-outline OCSVM anomaly detection model.

The training flow of the negative profile one-class support vector machine is similar to that of the positive profile one-class support vector machine, but the data packets are captured from the industrial control systems and an abnormal sample is acquired from the preprocessing unit for performing training.

e. Design of the cooperative discriminating rules of the OCSVM dual-outline model:

As shown in FIG. 4, when the OCSVM dual-outline model performs decision judgment on a test sample, the following rules are followed:

The test sample is detected through the positive profile model and the negative profile model respectively, and two models make a judgment respectively:

1 If the judgment results of the positive profile model and the negative profile model are "normal", a final result is "normal"; this sample is normal data traffic and is allowed to pass by the system.

2 If the judgment results of the positive profile model and the negative profile model are "abnormal", a final result is "abnormal"; this sample is abnormal data traffic and the system gives an alarm.

3 Under the condition that the judgment results of the positive profile model and the negative profile model are inconsistent, if the system needs to inhibit a "false alarm rate", the judgment result is "normal", and if the system needs to inhibit a "missed alarm rate", the judgment result is "abnormal".

We claim:

1. A Modbus TCP communication behaviour anomaly detection method, comprising the following steps:

feature extraction, wherein: Modbus TCP normal communication traffic and abnormal communication traffic collected in a system is converted into two respective sequences which each comprise Modbus function codes;

data preprocessing, wherein: a length r of short sequences is set; the two sequences of the Modbus function codes are cyclically processed respectively with a sliding window with the length of r; the two sequences of the Modbus function codes are each respectively converted into a plurality of short sequences with the length of r; in each plurality of short sequences, repeated short sequences are eliminated to obtain a set of short sequences arranged according to an appearance order for constructing, respectively, a one-class support vector machine (OCSVM) normal communication feature vector and an OCSVM abnormal communication feature vector;

modeling, wherein: a libsvm toolkit is invoked for generating a positive profile OCSVM model and a negative profile OCSVM model from, respectively, the OCSVM normal communication feature vector and the OCSVM abnormal communication feature vector;

particle swarm optimization (PSO) optimization, wherein: parameter optimization is performed on the positive profile OCSVM model and the negative profile OCSVM model respectively: initialized particles are transmitted to the positive profile OCSVM model/the negative profile OCSVM model as an OCSVM inherent parameter v and a gauss radial base parameter g; classification accuracy rates returned by the positive profile OCSVM model/the negative profile OCSVM model under the significance of cross verification are used as fitness values in a PSO model; and accordingly, iterative update is performed on a particle swarm;

dual-outline OCSVM anomaly detection, wherein: the positive profile OCSVM model and the negative profile OCSVM model are updated with an optimal OCSVM inherent parameter v and the gauss radial base parameter g respectively so as to perform anomaly detection, and the classification accuracy rates under the significance of cross verification are returned respectively; and cooperative discrimination rule of dual one-class support vector machines, wherein: Modbus TCP communication traffic collected in the system is assessed relative to both the positive profile OCSVM model and the negative profile OCSVM model; communication traffic that satisfies the positive profile OCSVM model is deemed "normal", and communication traffic that does not satisfy the positive profile OCSVM model is deemed "abnormal"; communication traffic that satisfies the negative profile OCSVM model is deemed "abnormal", and communication traffic that does not satisfy the negative profile OCSVM model is deemed "normal"; if a judgment result of the positive profile OCSVM model is "normal" and a judgment result of the negative profile OCSVM model is "normal", a final result is "normal"; if a judgment result of the positive profile OCSVM model is "abnormal" and a judgment result of the negative profile OCSVM model is "abnormal", a final result is "abnormal"; under the condition that two judgment results are inconsistent, if a "false alarm rate" needs to be inhibited, the judgment result is "normal", and if a "missed alarm rate" needs to be inhibited, the judgment result is "abnormal".

2. The Modbus TCP communication behaviour anomaly detection method according to claim 1, wherein:

the method further comprises the following steps:

data collection, wherein: normal Modbus TCP communication traffic data packets in the network are captured by wireshark packet capturing software; when the system is attacked by viruses, abnormal Modbus TCP communication traffic data packets in the network are captured by the wireshark packet capturing software; and said feature extraction further comprises: data packets, not containing the Modbus function codes, of the normal data packets and the abnormal data packets respectively, are separated from the data packet information to obtain communication traffic at a Modbus TCP client and a Modbus TCP server; the Modbus function codes are separated from the remaining data packet information; and the Modbus function codes are arranged according to a time order.

3. The Modbus TCP communication behaviour anomaly detection method according to claim 1, wherein said data preprocessing further comprises:

normalization processing is performed on the OCSVM feature vectors, allowing each element in the vectors to belong to the same order of magnitude.

4. The Modbus TCP communication behaviour anomaly detection method according to claim 1, wherein said PSO optimization further comprises:

maximum iteration times $k_{max}$ of a PSO algorithm under the condition that an end condition is always not satisfied, and limiting ranges for particle speed and locations are set;

swarms are randomly generated and parameter initialization is performed on the PSO algorithm according to the positive profile OCSVM model and the negative profile OCSVM model respectively, wherein each particle comprises an inherent parameter v of the one-class support vector machine and a gauss kernel function parameter g; and an initialization speed vector and a location vector are set for each particle;

OCSVM training is performed on the particles which act as the inherent parameter v of the one-class support vector machine and the kernel parameter g of the gauss kernel function; the returned classification accuracy rates under the significance of cross verification are used as the fitness values of the particles;

individual extremums and swarm extremums are continuously updated, with individual or swarm fitness values updated when a corresponding better fitness value appears;

whether an iteration exiting condition is satisfied is judged: if the maximum iteration times are exceeded or a set threshold is not exceeded after N times of continuous changes of the fitness values, the iteration process is exited; then the swarm extremum is a required optimal parameter; and the N is a set maximum continuous limiting value;

the particle swarm is updated according to particle location and speed update formulas; meanwhile, whether different dimensions of all the particles are within allowed limits is inspected; and if the different dimensions exceed the allowed limits, the different dimensions are limited within a pre-set range section.

5. The Modbus TCP communication behaviour anomaly detection method according to claim 1, wherein said dual-outline OCSVM anomaly detection respectively executes the following steps on the positive profile OCSVM model and the negative profile OCSVM model:

a particle transmitted in a PSO parameter optimization flow is accepted; two components of the particle are respectively set as the inherent parameter v of the one-class support vector machine and the gauss kernel function parameter g;

a set of the normal and abnormal Modbus TCP communication traffic data packets is acquired; +1 category labels are given to normal traffic data; and −1 category labels are given to abnormal traffic data;

a one-class support vector machine model for solving dual problems is constructed;

a decision function is constructed;

the classification accuracy rates under the significance of cross verification are calculated according to the decision function and the category labels;

the classification accuracy rates are returned to the PSO flow and are used as the particle fitness for calculating the value of the function Fit(i).

6. The Modbus TCP communication behaviour anomaly detection method according to claim 5, wherein said support vector machine model for solving dual problems is constructed such that:

$$\min_{\alpha_i} L_D = \frac{1}{2} \sum_{i=1}^{l} \sum_{j=1}^{l} \alpha_i \alpha_j K(x_i, x_j)$$

wherein $\alpha = (\alpha_1, \alpha_2, \ldots, \alpha_n)$ indicates a lagrangian operator, and $K(x_i, x_j)$ indicates a gauss kernel function to obtain the solution $\alpha^* = (\alpha_1^*, \alpha_2^*, \ldots, \alpha_n^*)$.

7. The Modbus TCP communication behaviour anomaly detection method according to claim 5, wherein said decision function is:

$$f(x) = \text{sgn}\left(\sum_{i=1}^{l} \alpha * K(x_i, x_j) - \rho^*\right)$$

$$\rho^* = \sum_{i=1}^{l} \alpha * K(x_i, x_j)$$

wherein $\rho^*$ is a compensation value of a terminal decision function of the one-class support vector machine, sgn( ) indicates a sign function and $K(x_i,x_j)$ indicates a gauss kernel function.

8. The Modbus TCP communication behaviour anomaly detection method according to claim 5, wherein said classification accuracy rates under the significance of cross verification are calculated by a 5-fold verification mode, specifically: training sets are equally divided into five parts; 4 parts are used for training the anomaly detection model every time; and the remaining part is used as a test set for verifying a detection effect.

* * * * *